United States Patent Office 3,431,543
Patented Mar. 4, 1969

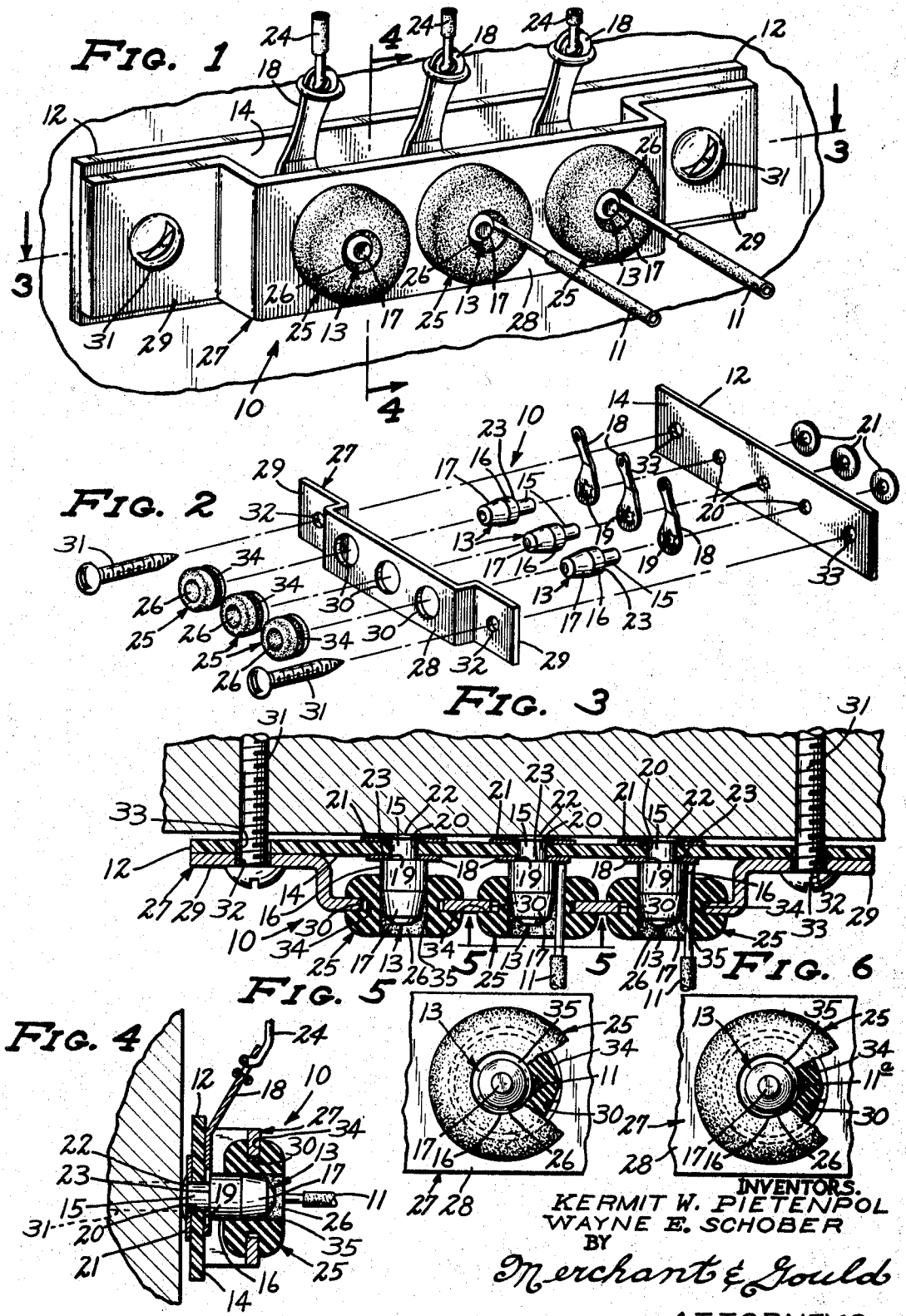

3,431,543
QUICK CONNECT ELECTRICAL CONNECTOR
Kermit W. Pietenpol and Wayne E. Schober, Minneapolis, Minn., assignors to Viking of Minneapolis, Div. of The Telex Corporation, South Minneapolis, Minn., a corporation of Delaware
Filed Dec. 6, 1966, Ser. No. 599,454
U.S. Cl. 339—254
Int. Cl. H01r 13/24, 13/62
2 Claims

ABSTRACT OF THE DISCLOSURE

A plurality of post type electrical terminals secured in spaced relationship on an insulated base and provided with bracket means mounting an annular resilient member in concentric relation to each of the terminals to permit electrical connection of lead wires of an electrical device.

Summary

In the manufacture of various electrical devices, one or more of the components thereof must often be bench tested by connecting such components to an indicator, such as a voltmeter or the like, or alternatively to a source of electrical energy, to assure proper function of the device upon completion. For instance, in the manufacture of tape decks or the like, the electrical motors thereof must be put through a run-in period to assure proper operation over an extended period of time. During such bench testing, present day mass production techniques call for the running in of a great many such motors at the same time. Therefore, some means for quickly connecting and/or disconnecting the lead wires of the motors to a source of electrical energy must be provided to assure an efficient operation of this type which consumes but a minimum of time and effort. It is also desirable to produce an electrical connector of this type which is of unitary construction. That is, a connector in which no parts thereof must be removed or moved by one hand of an operator while effecting an electrical connection or disconnection of the lead wires of the motors or other electrical devices by the other hand of an operator.

With the above in mind, we provide a plurality of electrical connectors, adapted for quick connection and/or disconnection of electrical lead wires, which consist of a base formed from an insulating material and having a plurality of pin terminals mounted thereon. Each of the pin terminals includes an intermediate portion and an outer end portion which tapers outwardly and radially inwardly from the intermediate portion. We further provide resilient means in the nature of a plurality of grommets formed from rubber-like material with each thereof having an opening therethrough which is adapted to receive one each of the pin terminals therein. A bracket, rigidly mounted with respect to the pin terminals, mounts each of the grommets with the opening thereof generally concentric with respect to its respective terminal with each terminal and its respective grommet defining an outwardly opening annular mouth. Each annular mouth permits the insertion of a lead wire or wires between its respective terminal and grommet to frictionally hold same in electrical contact with the terminal.

It is a primary object of our invention to provide a device of the class above described which permits quick connection and/or disconnection of an electrical device to an indicator or source of electrical power.

It is a further object of our invention to provide a device of the class above described which is constructed of a minimum of moving parts and which does not require movement or removal of parts thereof by one hand of an operator while effecting an electrical connection and/or disconnection of a lead wire by the other hand of an operator.

Another object of our invention is the provision of a device of the class above described which has a built in safety factor preventing the bridging or shorting of two terminals by the hand, or a tool or other object held in the hand, of a user, or accidentally dropped across the terminals.

A still further object of the present invention is the provision of a device of the class above described which is extremely inexpensive to produce and which is durable in use.

These and other highly important objects will become apparent upon consideration of the following detailed specification, attached drawings, and appended claims.

Description of the drawings

Referring with particularity to the drawings wherein like reference numerals indicate like parts throughout the several views:
FIG. 1 is an enlarged view of our novel electrical connector mounted in an operative position;
FIG. 2 is a view in exploded perspective thereof;
FIG. 3 is a view in horizontal section as seen from the line 3—3 of FIG. 1;
FIG. 4 is a view in vertical section as seen from the line 4—4 of FIG. 1;
FIG. 5 is an enlarged sectional view as seen from the line 5—5 of FIG. 3, portions thereof broken away and shown in section; and
FIG. 6 is a view similar to FIG. 5, but showing the connector in use with a wire of a lighter gauge.

Specification

Referring with greater particularity to the drawings, there is shown a novel electrical connector indicated in its entirety by the reference numeral 10. Connector 10 is of the binding post type and normally is used during bench testing procedures wherein it is desirable to make quick, temporary electrical connections or disconnections of the lead wires 11 of a device or devices, not shown, to be tested. The number of terminals, of course, being dictated by the type and amount of electrical devices which are to be tested at any given time. In the embodiment shown, connector 10 is comprised of a base 12 formed from an insulating material such as plastic, and upon which a plurality (3 in number) of pin terminals 13 are mounted in a manner to project outwardly from one side 14 thereof on axes normal to the plane thereof. Each of the pin terminals 13 includes a diametrically reduced inner end portion 15, an intermediate portion 16, and an outer end portion 17 which tapers outwardly and radially inwardly from the intermediate portion 16 for a reason to become apparent hereinafter.

A plurality of elongated solder terminals 18 are each provided at one end with an aperture 19 which is adapted to receive therethrough one each of the reduced inner ends 15 of the terminals 13. Each of the inner ends 15 of terminals 13 is received through one of a row of openings 20 formed in the base 12 and a washer 21. Thereafter, the inner end portion 15 is peened over as at 22 to securely rivet terminals 13 to base 12. Prior to peening of the inner end portion 15, the solder terminals 18 are positioned as in FIG. 1 and after such peening are securely held in place against the base 12 by engagement with the shoulder 23 defined by the inner end portion 15 and intermediate portion 16 of each terminal 13. With the above arrangement, each terminal 13 is securely fixed to the base 12 with the solder terminals 18 providing means for attaching lead wires 24 to the terminal 13 which lead to an indicator, not shown, such as a voltmeter or alternatively to a source of electrical power.

For the purpose of frictionally holding the lead wires 11 leading from an electrical device, not shown, in electrical contact with selected ones of the terminals 13, there is provided a plurality of grommets 25. Each of the grommets 25 is formed from a resilient rubber-like material and has an opening 26 formed therethrough which is adapted to receive therein the outer end portion 17 and that portion of the intermediate portion 16 adjacent the outer end portion 17.

Bracket means indicated generally by the numeral 27 is rigidly mounted with respect to the terminals 13 and serves to mount the grommets 25 with the openings 26 therethrough, each in a generally concentric relationship with its respective terminal 13. Bracket means 27 includes an intermediate portion 28 which is laterally offset from the opposite end portions 29 which act as feet to support the intermediate portion 28 in outwardly spaced relationship to the side 14 of base 12. A plurality of openings 30 are formed in the intermediate portion 28 of bracket 27 and are spaced in a row therealong so as to be generally concentric with each one of the terminals 13. The openings 30 are maintained in concentric relationship with respect to the terminals 13 by means of a pair of threaded screws 31 which pass through aligned openings 32, 33 in the end portions 29 of bracket 27 and opposite end portions of the base 12 respectively and thence into screw threaded engagement with a bench top or back indicated by the reference character A.

As shown particularly in FIGS. 1, 3, and 4, the grommets 25 are mounted in a generally concentric relationship with their respective terminals 13 by reception of the peripheral edge of their respective opening 30 of bracket 27 in a radially outwardly opening groove 34 formed in the periphery of each of the grommets 25. It will be noted by reference to FIGS. 3, 4, that the minimum diametric dimension of the grooves 34 is less than the diametric dimension of their respective opening 30. Also the openings 24 of the grommets 25 have a diametric dimension which is approximately equal to or slightly less than the maximum diametric dimension of their respective terminal 13. This arrangement allows insertion of wires 11 having a wider range of gauges than would be possible were the grommets tightly mounted within the openings 30 by permitting slight radial distortion of the grommets 25 at the point of contact with wires 11. It might also be here noted that tapering of the outer end portion 17 of the terminals 13 helps to define with their respective grommets an outwardly opening annular mouth 35 which facilitates the insertion of the lead wires 11.

When an operator decides to make a connection of a lead wire 11, he merely inserts the free end of the wire 11 into the opening 26 of a selected one of the grommets 25. As the end of the wire 11 enters the annular mouth 35, the adjacent part of the grommet is forced radially outwardly from terminal 13. This causes the wire 11 to be forced against the terminal 13, due to the resiliency of the grommet 25, with sufficient force to effect an electrical connection therewith. As seen particularly in FIG. 6, the wire 11a is of a lesser gauge and the resiliency of the grommet 25 is still sufficient to cause electrical contact of the wire 11a with terminal 13. In each case, frictional engagement of the wire 11 with the grommet is such as to retain the wire 11 in adequate electrically conductive engagement with the terminal 13. Conversely pulling on the wire 11 by one hand of an operator overcomes this frictional engagement and the wire 11 is easily removed without manipulation of a locking device by the other hand of an operator.

It will be noted that connector 10 has a built-in safety factor in that the intermediate portion 28 of bracket 27 is spaced from the base 12 a distance to assure that the grommets 25 are positioned relative to their respective terminals 13 in such a manner that the outer end portions 17 of terminals 13 terminate within the openings 26 of the grommets 25. As such, an operator's hand, or a tool held in the hand of an operator, is prevented from bridging any two of the terminals 13.

With the above arrangement of parts, it will be seen than an extremely effective temporary electrical connector has been invented in which an adequate electrical connection and/or disconnection of lead wires for test purposes of an electrical device may be made with either hand of an operator without the use of the other hand to effect such connection and/or disconnection.

While we have shown and described a specific embodiment of this invention, further modifications and improvements will occur to those skilled in the art. We desire it to be understood, therefore, that this invention is not intended to be limited to the particular form shown, and we intend in the appended claims to cover all modifications which do not depart from the spirit and scope of this invention.

What is claimed is:

1. An electrical connector adapted to receive the end of an electrical lead wire, said connector comprising:
   (a) a base;
   (b) a terminal projecting outwardly from one side of said base and having an outer free end portion;
   (c) radially resilient means having an opening formed therethrough adapted to receive said outer end portion of said terminal therein;
   (d) bracket means rigidly mounted with respect to said terminal mounting said resilient means with the opening thereof generally concentric with said outer end portion of said terminal whereby the end of a lead wire inserted between said resilient means and said terminal in a direction generally axially thereof is frictionally held in electrical contact with said terminal by said resilent means,
   (e) said outer end portion of said terminal tapers outwardly and radially inwardly and defines with said resilient means an annular, outwardly opening mouth to facilitate the insertion of the end of a lead wire between said terminal and said resilient means.

2. The structure defined in claim 1 in which said outer end portion of said terminal terminates within the opening of said resilient means.

References Cited

UNITED STATES PATENTS

| 1,697,814 | 1/1929 | Forbes | 339—126 |
| 2,919,421 | 12/1959 | Modrey | 339—126 X |
| 3,260,988 | 7/1966 | Dean et al. | 339—254 |
| 3,343,121 | 9/1967 | Lewis | 339—95 |

MARVIN A. CHAMPION, *Primary Examiner.*

J. R. MOSES, *Assistant Examiner.*